US009884771B1

(12) United States Patent
Rice et al.

(10) Patent No.: US 9,884,771 B1
(45) Date of Patent: Feb. 6, 2018

(54) DEVICE AND METHOD FOR TRAPPING NON-AQUEOUS-PHASE LIQUIDS PRIOR TO A PERMEABLE REACTIVE BARRIER FOR THE TREATMENT OF CONTAMINATED GROUNDWATER

(71) Applicants: John M. Rice, Fitchburg, WI (US); Thomas R. Stolzenburg, Madison, WI (US)

(72) Inventors: John M. Rice, Fitchburg, WI (US); Thomas R. Stolzenburg, Madison, WI (US)

(73) Assignee: TRC ENVIRONMENTAL CORPORATION, North Windsor, CT (US)

( * ) Notice: Subject to any disclaimer, the term of this patent is extended or adjusted under 35 U.S.C. 154(b) by 0 days.

(21) Appl. No.: 13/766,927

(22) Filed: Feb. 14, 2013

Related U.S. Application Data

(60) Provisional application No. 61/600,246, filed on Feb. 17, 2012.

(51) Int. Cl.
| C02F 1/00 | (2006.01) |
| B09C 1/00 | (2006.01) |
| C02F 103/06 | (2006.01) |
| C02F 1/28 | (2006.01) |

(Continued)

(52) U.S. Cl.
CPC ............ C02F 1/001 (2013.01); *B09C 1/002* (2013.01); *C02F 1/281* (2013.01); *C02F 1/283* (2013.01); *C02F 1/288* (2013.01); *C02F 1/40* (2013.01); *C02F 1/725* (2013.01); *C02F 2103/06* (2013.01)

(58) Field of Classification Search
CPC ....... B09C 1/002; B09C 1/08; B09C 2101/00; C02F 2103/06; C02F 1/001; C02F 1/281; C02F 1/283; C02F 1/288; C02F 1/40; C02F 1/725
USPC ........... 210/170.07, 747.7, 747.8; 405/128.2, 405/128.5
See application file for complete search history.

(56) References Cited

U.S. PATENT DOCUMENTS

| 5,080,528 A | 1/1992 | Ressi di Cervio |
| 5,584,605 A | 12/1996 | Beard |
| 6,116,816 A * | 9/2000 | Suthersan et al. ............ 210/681 |

(Continued)

FOREIGN PATENT DOCUMENTS

WO 2005058516 6/2005

OTHER PUBLICATIONS

Brourman et al, Innovative Strategies for DNAPL Containment and Degradation, Nashua, New Hampshire, Jun. 2001, 2001 International Containment and Remediation Technology Conference and Exhibition, 4 pages.*

(Continued)

*Primary Examiner* — Matthew O Savage
(74) *Attorney, Agent, or Firm* — Quarles & Brady LLP

(57) ABSTRACT

A groundwater treatment system for collecting a non-aqueous-phase liquid (NAPL) in a flow path of contaminated water in a body of water, the contaminated water moving toward a permeable reactive barrier (PRB) including a treatment agent for treating the contaminated groundwater. The groundwater treatment system including a collection layer positioned up-gradient of the PRB and permeable to the NAPL and the contaminated water. The collection layer including a NAPL collecting element to inhibit the NAPL from flowing to the PRB.

21 Claims, 5 Drawing Sheets

(51) Int. Cl.
*C02F 1/72* (2006.01)
*C02F 1/40* (2006.01)

(56) References Cited

U.S. PATENT DOCUMENTS

| | | | |
|---|---|---|---|
| 6,386,796 B1 | 5/2002 | Hull | |
| 6,558,081 B2 | 5/2003 | Hull | |
| 6,663,781 B1 * | 12/2003 | Huling et al. | 210/668 |
| 8,419,314 B1 | 4/2013 | McLinn | |
| 2009/0110486 A1 | 4/2009 | McLinn | |

OTHER PUBLICATIONS

Henderson et al, Long-Term Performance of Zero-Valent Iron Permeable Reactive Barriers: A Critical Review, Jan. 2007, Environmental Engineering Science, vol. 24, No. 4, pp. 401-424.*

Powell et al, Permeable Reactive Barrier Technologies for Contaminant Remediation, Sep. 1998, Environmental Protection Agency, EPA/600R-98/125, pp. 39-42.*

Huling et al, Dense Nonaqeuous Phase Liquids, Mar. 1991, EPA/540/4-91-002, pp. 1-21.*

Wiedemeier et al, Technical Protocol for Evaluating Natural Attenuation of Chlorinated Solvents in Ground Water, EPA/600/R-98/128, pp. 1-248.*

Mutch, R. et al., "Monitoring the uplift of a low-permeability sediment cap due to gas entrapment beneath the cap: findings of the first 18 months", 2005, The Annual International Conference on Soils, Sediment, Water, and Energy, University of Massachusetts, Amherst, Massachusetts.

Boles et al., Temporal Variation in Natural Methane Seep Rate Due to Tides, Coal Oil Point Area, California, J. Geophys. Res. 106:27077-27086, 2001.

McAnulty et al., NAPL Migration from Contaminated Sediment 2: Implications for Remedial Design, Presented at the Fourth International Conference on Remediation of Contaminated Sediments, Savannah, Georgia, 2007

McLinn et al., From DNAPL to LNAPL—Methanogeneisis Facilitates MGP Tar Migration from Contaminated Sediment in a Tidal River, Proceedings of the Fourth International Conference on Remediation of Chlorinated and Recalcitrant Compounds, Monteray, California, 2004.

McLinn et al., NAPL Migration from Contaminated Sediment 1: Diagnosis and Transport Mechanisms, Presented at the Fourth International Conference on Remediation of Contaminated Sediments, Savannah, Georgia 2007.

Zhao et al., Combined Active Capping/Wetland Demonstration in the Chicago River, Proceedings of the Fourth International Conference on Remediation of Contaminated Sediments, Savannah, Georgia, 2007.

* cited by examiner

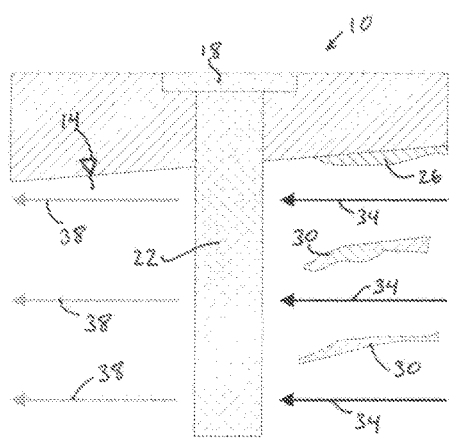
Fig. 1 - Prior Art
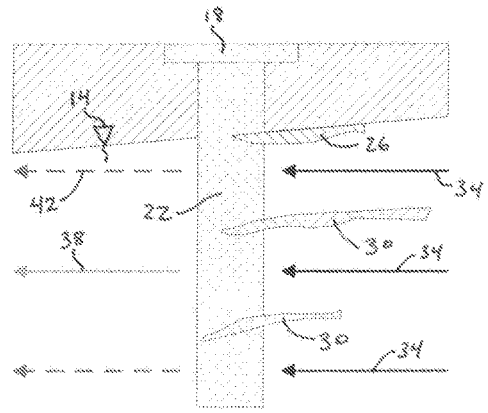
Fig. 2 - Prior Art
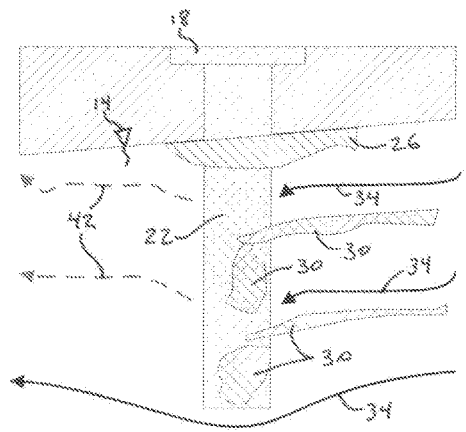
Fig. 3 - Prior Art
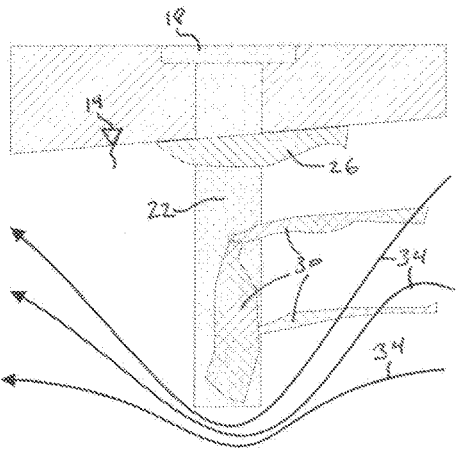
Fig. 4 - Prior Art

DEVICE AND METHOD FOR TRAPPING NON-AQUEOUS-PHASE LIQUIDS PRIOR TO A PERMEABLE REACTIVE BARRIER FOR THE TREATMENT OF CONTAMINATED GROUNDWATER

CROSS-REFERENCE TO RELATED APPLICATION

This application claims benefit from U.S. Provisional Application 61/600,246 filed Feb. 17, 2012, the entire contents of which are incorporated herein by reference for all purposes.

BACKGROUND

The invention relates generally to devices and methods for trapping and removing non-aqueous-phase liquids (NAPLs) from groundwater or sub-surface soil prior to the treatment of the dissolved-phase contaminants by a permeable reactive barrier (PRB).

PRBs are often placed in the path of contaminated groundwater in order to remove dissolved contaminants. PRBs provide a cost-effective means of treating groundwater without mechanical systems.

PRBs are typically configured to remove specific contaminants (i.e., target compounds) as called for on a case-by-case basis. The specific target compound may or may not be a dissolved NAPL. That is to say, the target compound that the PRB intends to remove may be a NAPL at a very low concentration in the groundwater. The following application will discuss the target compound as the contaminant that the PRB is designed to remove, which may or may not include a NAPL. The following discussion will refer to NAPLs as contaminants that the PRB is not configured to process.

In the cases described above, NAPL may be migrating through the subsurface in conjunction with associated dissolved-phase contaminants (i.e., target compounds) in the groundwater. In those cases, the NAPL can cause the PRB to fail in part or in whole, either by 1) NAPL consuming the treatment chemical in the PRB matrix which was intended for low (dissolved) concentrations of target compound or 2) NAPL forming a barrier that is impermeable to groundwater on the up-gradient side of the PRB, or 3) physically coating or in other ways fouling the reactive surfaces of the PRB.

FIG. 1 shows a typical PRB groundwater treatment system 10. The PRB groundwater treatment system is positioned adjacent a water table 14 and includes a low permeability cap 18 and a PRB 22 positioned in the groundwater flow path.

In some instances, hydraulically permeable PRBs 22 are also used to treat groundwater that has been contaminated by hazardous materials such as pesticides, volatile organic compounds (VOCs), polycyclic aromatic hydrocarbons (PAHs), polychlorinated dioxins (PCDDs), polychlorinated furans (PCDFs), polychlorinated biphenyls (PCBs), heavy metals, synthetic organic compounds, and the like.

Generally, NAPLs may be broken into two categories; light non-aqueous-phase-liquids (LNAPLs) and dense non-aqueous-phase-liquids (DNAPLs). LNAPLs will tend to the top portion of the ground water flow path while DNAPLs will tend to the bottom portion of the groundwater flow path.

PRBs 22 typically include a permeable reactive layer that has been designed to treat the target contaminants. The reactive material may include, but is not limited to, zero valent iron (ZVI), activated carbon, apatite, organoclay, and/or various type of degradable organic material.

FIG. 1 shows LNAPLs 26 and DNAPLs 30 in a contaminated groundwater flow 34 but not yet in contact with the PRB 22. In the situation depicted in FIG. 1, the PRB 22 is functioning normally and is not yet fouled with NAPLs 26, 30. The contaminated groundwater 34 flows into the PRB 22, the PRB 22 treats a target compound, as desired, and treated groundwater 38 exits the PRB 22.

Referring to FIG. 2, when unexpectedly high concentrations of the target compound and/or NAPLs (e.g., LNAPL 26 or DNAPL 30), prematurely consume the treatment capacity of the PRB 22, the design life of the PRB 22 is decreased. That is, functional failure occurs sooner than planned. The PRB 22 is designed to address dissolved (lower) concentrations of the target compound, rather than higher concentrations of the target compound in addition to or including NAPLs (e.g., LNAPL 26 or DNAPL 30). FIG. 2 shows that concentrations of NAPLs 26, 30 may permeate the PRB 22. Once the PRB 22 is fouled, some groundwater passing through the PRB 22 will be properly treated (i.e., treated groundwater 38), but some groundwater exiting the PRB 22 will be partially treated groundwater 42. That is to say, the partially treated groundwater 42 still contains appreciable levels of undesirable compounds.

Referring to FIG. 3, the DNAPL 30 coats or physically fouls the treatment chemical of the PRB 22, the design life of the PRB 22 is decreased as the treatment chemical is unavailable to react with the target compound(s) in a dissolved state. The design life of the PRB 22 is calculated assuming uniform flow of contaminated groundwater 34 through all parts of the PRB 22. If the flow of contaminated groundwater 34 is focused on only portions of the treatment PRB 22, the full calculated treatment capacity of that PRB 22 is not realized because the focused flow overwhelms those portions of the PRB 22 receiving all the flow and contamination. This increased localized water flow rate can cause premature breakthrough of the treatment media. In addition, a partial blocked PRB 22 will lower the effective transmissivity of the PRB 22 and potentially force a portion of the contaminated groundwater 34 to flow around the PRB 22, resulting in a partial failure (e.g., as shown at the bottom of FIG. 3).

Referring to FIG. 4, the PRB 22 is completely blocked by accumulation of DNAPL 30 and LNAPL 26. The contaminated groundwater 34 bypasses the PRB 22 altogether without any treatment. The contaminants in the water are not treated or removed, essentially rendering the PRB 22 ineffective.

Referring again to FIG. 4, in the case of NAPL 26,30 migrating through the water-permeable PRB 22, the NAPL 26,30 migrates through the PRB 22 without any treatment. The contaminants in the NAPL 26,30 are free to dissolve into the groundwater down-gradient from the PRB 22, essentially rendering the PRB 22 ineffective.

BRIEF SUMMARY OF THE INVENTION

From the above, it should be apparent that the art needs devices and methods that trap and collect the NAPLs 26,30 before they reach the treatment media of the PRB 22. Such trapping would permit the PRB 22 to function properly.

The problem that has been previously unrecognized and unresolved with PRBs that are intended to be hydraulically permeable is the continuing migration of NAPLs that may consume the treatment chemical, physically foul the matrix, or completely or partially obstruct the passage of water. It is instructive to understand that when a NAPL impinges on a PRB intended for treating dissolved concentrations the NAPL may migrate through the water-permeable PRB after only being partially treated.

In one aspect, the present invention provides an apparatus and a method for trapping NAPL migrating toward a PRB in a collection layer before it encounters the treatment media of the PRB. The method comprises the step of interposing in the path of the NAPL, a NAPL collection device that may include a permeable collection sump and/or a hanging baffle. The permeable collection sump is suited to collect dense non-aqueous-phase liquid (DNAPL) and the hanging baffle is suited to collect light non-aqueous-phase liquid (LNAPL).

In a related aspect, in some embodiments the invention may incorporate devices and methods to remove the NAPL, including physical removal, or removal through oxidation, volatilization or other means.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 1 is a side sectional view of a prior art PRB immediately after installation;

FIG. 2 is a side sectional view of a prior art PRB after NAPL has consumed a large portion of the treatment capacity;

FIG. 3 is a side sectional view of a partially NAPL-blocked prior art PRB;

FIG. 4 is a side sectional view of a completely NAPL-blocked prior art PRB;

Figure 5:
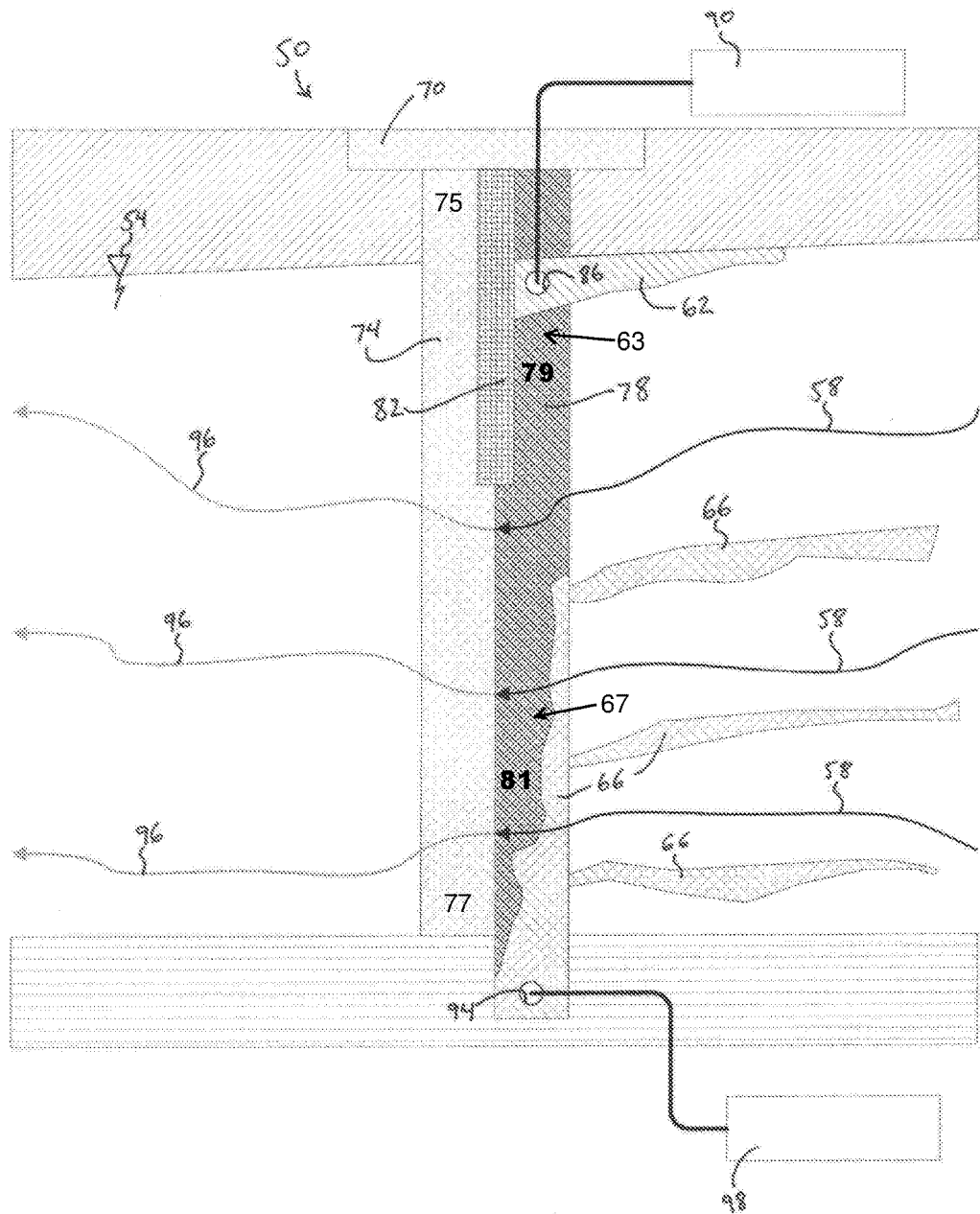
FIG. 5 is a side sectional view of a water-permeable PRB according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The present invention relates to the inventors' observation that NAPL can prematurely consume the treatment capacity of a PRB, physically foul it, and or block the flow of water through it. Also NAPL, impinging on a PRB, can pass directly through it, only partially treated thereby defeating its intended purpose. If the PRB is blocked partially or completely, groundwater will be diverted around the PRB either partially or completely. A blockage could also cause failure of the PRB by focusing groundwater flow through a section of the PRB causing premature depletion of the treatment chemical. NAPL could also migrate through a water-permeable PRB defeating the treatment component and allowing a source of groundwater contamination to migrate down-gradient (that is, downstream) from the PRB.

FIG. 5 shows a groundwater treatment system 50 situated adjacent a water table 54 and in a flow of contaminated ground water 58 that includes LNAPLs 62 and DNAPLs 66. The groundwater treatment system 50 includes a low permeability upper cap 70, a PRB 74 having an top end 75 engaging the upper cap 70 and a bottom end 77, the PRB 74 depending vertically from the upper cap 70, a NAPL collection layer 78 depending vertically from the upper cap 70 and having an upper portion 79 engaging the upper cap 70 and a lower portion 81, the upper portion 79 defining an upper LNAPL collecting portion 63, the lower portion 81 defining a lower DNAPL collecting portion 67, and an impermeable barrier or containment baffle 82 positioned between the PRB 74 and the collection layer 78. As shown in FIG. 5, ground water 58 flows through but not beneath the PRB 74 and the collection layer 78, which are keyed into an impermeable layer.

The collection layer 78 has a coarser grain size than either the PRB 74 or the aquifer through which the contaminated groundwater 58 is flowing. The collection layer 78 provides a condition where LNAPLs 62 can easily rise to the top portion of the collection layer 78 and DNAPLs 66 will travel with gravity to a bottom portion of the collection layer 78. The thickness of the collection layer 78 can be arranged such that the expected flow of DNAPL 66 and LNAPL 62 will not reach the PRB 74 but will rather accumulate in the collection layer 78.

An LNAPL sump 86 is positioned in the top portion of the collection layer 78 and is arranged such that LNAPL 62 collects in the LNAPL sump 86. When a predetermined volume of LNAPL 62 has collected, or upon a predetermined time interval, or upon another triggering event, a removal device 90 (e.g., pump, vacuum, et cetera) is fluidly connected to the LNAPL sump 86 and the LNAPL 62 stored therein is removed.

A DNAPL sump 94 is positioned in the bottom portion of the collection layer 78 and is arranged such that DNAPL 66 collects in the DNAPL sump 94. The DNAPL sump 94 may be positioned below the lower extremity of the PRB 74 to provide a larger sump volume while avoiding contamination of the lower portion of the PRB 74. However, the DNAPL sump 94 does not have to be positioned below the PRB 74. When a predetermined volume of DNAPL 66 has collected, or upon a predetermined time interval, or upon another triggering event, a removal device 98 (e.g., pump, vacuum, et cetera) is fluidly connected to the DNAPL sump 94 and the DNAPL 66 stored therein is removed.

The containment baffle 82 is positioned between the PRB 74 and the collection layer 78 to inhibit LNAPL 62 from travelling through the collection layer 78 and fouling the PRB 74. As the LNAPL 62 flows into the collection layer 78 and collects in the LNAPL sump 86, the containment baffle 82 maintains the LNAPL 62 in the collection layer 78 and inhibits crossover to the PRB 74.

In operation, the contaminated groundwater 58 flows through the collection layer 78 where LNAPLs 62 and DNAPLs 66 are collected. The contaminated groundwater 58 is then treated in the PRB 74 and treated ground water 96 exits. The groundwater treatment system 50 is shown bound on a bottom end, but need not be.

Figure 6:
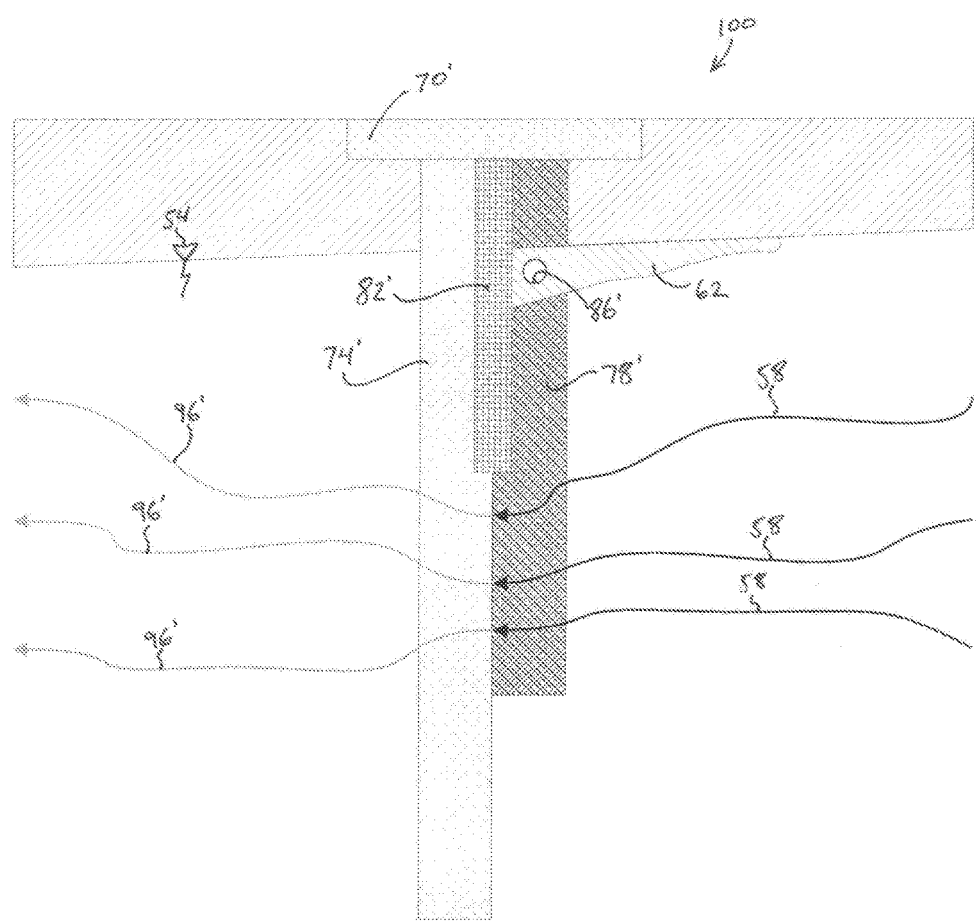
FIG. 6 is a side sectional view of another water-permeable PRB according to the present invention, treating contaminated groundwater and collecting LNAPL.

FIG. 6 illustrates another construction of the invention. A groundwater treatment system 100 includes a low permeability cap 70', a PRB 74', a NAPL collection layer 78', and an impermeable barrier or containment baffle 82' positioned between the PRB 74' and the collection layer 78'. The groundwater treatment system 100 may be used where only LNAPLs 62 are a concern.

An LNAPL sump 86' is positioned in the top portion of the collection layer 78' and is arranged such that LNAPL 62 collects in the LNAPL sump 86'. When a predetermined volume of LNAPL 62 has collected, or upon a predetermined time interval, or upon another triggering event, the removal device 90 (e.g., pump, vacuum, et cetera) may be fluidly connected to the LNAPL sump 86' and the LNAPL 62 stored therein removed.

The containment baffle 82' is positioned between the PRB 74' and the collection layer 78' to inhibit LNAPL 62 from travelling through the collection layer 78' and fouling the PRB 74'. As the LNAPL 62 flows into the collection layer 78' and collects in the LNAPL sump 86', the containment baffle 82' maintains the LNAPL 62 in the collection layer 78' and inhibits crossover to the PRB 74'.

Figure 7:
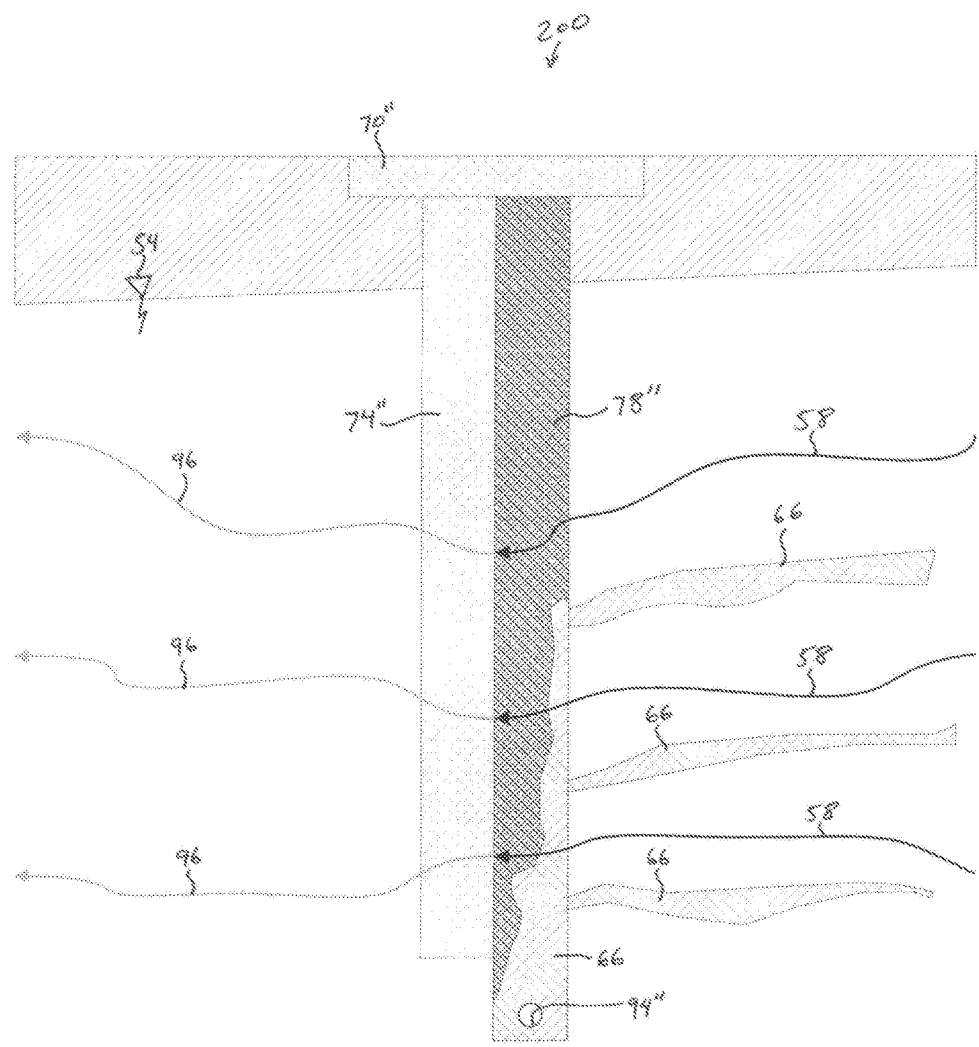
FIG. 7 is a side sectional view of another water-permeable PRB according to the present invention, treating contaminated groundwater and collecting DNAPL.

FIG. 7 illustrates another construction of the invention. A groundwater treatment system 200 includes a low permeability cap 70", a PRB 74", and a NAPL collection layer 78". The groundwater treatment system 200 may be used where only DNAPLs 66 are a concern.

A DNAPL sump 94" is positioned in the bottom portion of the collection layer 78" and is arranged such that DNAPL 66 collects in the DNAPL sump 94". The DNAPL sump 94" may be positioned below the lower extremity of the PRB 74" to provide a larger sump volume while avoiding contamination of the lower portion of the PRB 74". However, the DNAPL sump 94" does not have to be positioned below the PRB 74". When a predetermined volume of DNAPL 66 has collected, or upon a predetermined time interval, or upon another triggering event, the removal device 98 (e.g., pump, vacuum, et cetera) may be fluidly connected to the DNAPL sump 94" and the DNAPL 66 stored therein removed.

Figure 8:
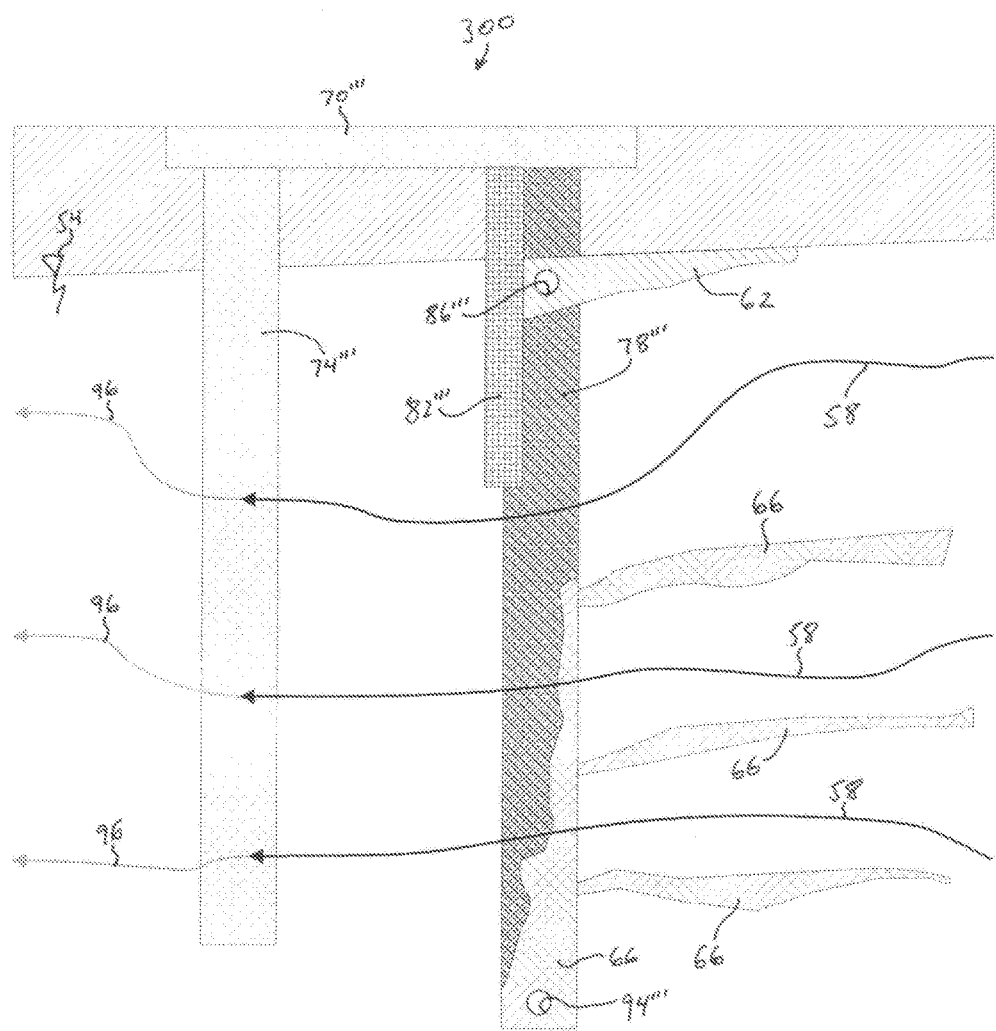
FIG. 8 is a side sectional view of another water-permeable PRB according to the present invention.

FIG. 8 shows a groundwater treatment system 300 similar to the groundwater treatment system 50 but wherein the PRB 74''' is spaced from the collection layer 78'''. All components are marked the same as discussed above with respect to the groundwater treatment system 50 and referenced with triple prime ("') reference numbers.

The present invention provides devices and methods to inhibit NAPLs from fouling, blocking, or otherwise rendering PRBs ineffective. To this end, a collection layer permeable to the NAPL and the contaminated water is disposed up-gradient (that is, upstream) of the PRB. The collection layer collects the NAPL and includes a collecting element (for example, a sump and/or a baffle) to draw the NAPL away from the collection layer or otherwise inhibit the NAPL from flowing to the PRB.

The present device could also be constructed with two separate trenches separated by a nominal distance of native material. The up-gradient trench would be constructed to trap LNAPL and DNAPL, while the down-gradient trench would be constructed with treatment media either installed in the trench or blended into the native soil, as shown in FIG. 5.

By "water table," we mean a surface where water pressure equals atmospheric pressure (that is, the "surface" of the body of water).

From the above description, it should be apparent that the present invention provides improved devices and methods for preventing NAPL from causing functional failure of a PRB intended for treating target chemicals dissolved in migrating groundwater.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements within the spirit and scope of the invention as set forth in the appended claims.

We claim:

1. An apparatus installed in a flow path of groundwater in an aquifer, wherein the groundwater comprises dissolved contaminants, wherein at least one non-aqueous phase liquid (NAPL) migrates in the groundwater, the NAPL selected from the group consisting of light NAPL (LNAPL) and dense NAPL (DNAPL), the apparatus comprising:
   a low-permeability upper cap;
   a permeable reactive barrier (PRB) having a top end and a bottom end, the PRB depending vertically from the upper cap and being disposed in the flow path of the groundwater, permeable to the contaminated groundwater, and comprising a treatment agent configured to treat the dissolved contaminants; and
   a collection layer depending vertically from the upper cap, and having an upper portion defining an upper LNAPL collecting portion positioned such that migrating LNAPL accumulates in the LNAPL collecting portion, the collection layer positioned up-gradient of the PRB and permeable to the at least one NAPL and the contaminated groundwater, the collection layer having a coarser grain size than either the PRB or the aquifer.

2. The apparatus of claim 1, wherein the collecting portion comprises a sump that draws NAPL away from the collection layer.

3. The apparatus of claim 2, the bottom end of the PRB positioned such that the contaminated groundwater does not flow beneath the PRB, the collection layer having a lower portion defining a lower DNAPL collecting portion, and wherein the sump is disposed proximate the lower DNAPL collecting portion.

4. The apparatus of claim 2, wherein the sump is disposed proximate the upper LNAPL collecting portion.

5. The apparatus of claim 2, further comprising an impermeable baffle between the collection layer and the PRB.

6. The apparatus of claim 1, further comprising an impermeable baffle between the collection layer and the PRB.

7. The apparatus of claim 1, wherein the PRB includes a treatment agent selected from the group consisting of zero valent iron (ZVI), activated carbon, apatite, and organoclay.

8. A method of treating contaminants dissolved in groundwater in a flow path through an aquifer, wherein at least one non-aqueous phase liquid (NAPL) selected from the group consisting of light NAPL (LNAPL) and dense NAPL (DNAPL) migrates in the groundwater, the method comprising:
   installing an apparatus comprising a low-permeability upper cap, a permeable reactive barrier (PRB) depending vertically from the upper cap and having a top end and a bottom end, the PRB being disposed in the flow path of the groundwater, being permeable to the groundwater and comprising a treatment agent configured to treat the dissolved contaminants, and, up-gradient of the PRB, a NAPL collection layer depending vertically from the upper cap, the collection layer having a coarser grain size than either the PRB or the aquifer and having an upper portion defining an upper LNAPL collecting portion positioned such that migrating LNAPL can accumulate in the upper LNAPL collecting portion, the collection layer permeable to the at least one NAPL and the contaminated groundwater, whereby the migrating LNAPL accumulates in the upper LNAPL collecting portion and dissolved contaminants are treated in the PRB.

9. The method of claim 8, further comprising drawing the NAPL away from the collection layer to a sump.

10. The method of claim 9, further comprising removing the NAPL from the sump.

11. The method of claim 10, wherein removing the NAPL comprises pumping the NAPL out of the sump.

12. The method of claim 8, wherein the contaminated groundwater does not flow beneath the PRB and the at least one NAPL collecting portion is a lower DNAPL collecting portion, and wherein the step of installing the apparatus comprises positioning the PRB such that the contaminated groundwater does not flow beneath the PRB and wherein DNAPL accumulates at the lower DNAPL collecting portion.

13. The method of claim 12, further comprising collecting the DNAPL in a DNAPL sump.

14. The method of claim 13, further comprising removing the DNAPL from the DNAPL sump.

15. The method of claim 8, wherein the LNAPL accumulates at the LNAPL collecting portion.

16. The method of claim 15, further comprising collecting the LNAPL in an LNAPL sump.

17. The method of claim 16, further comprising removing the LNAPL from the LNAPL sump.

18. The method of claim 8, wherein the apparatus further comprises an impermeable baffle positioned at the upper portion of the collection layer so that the LNAPL accumulates up-gradient of the PRB.

19. The method of claim 18, wherein the LNAPL flows through the collection layer and collects at the impermeable baffle.

20. The method of claim 19, further comprising removing the LNAPL from an upper LNAPL collecting portion through an LNAPL sump up-gradient of the impermeable baffle.

21. The method of claim 8, wherein the PRB includes a treatment agent selected from the group consisting of zero valent iron (ZVI), activated carbon, apatite, and organoclay.

* * * * *